April 6, 1954   H. L. HUSTED   2,674,708
DAMPING ARRANGEMENT FOR ELECTRIC MOTOR FOLLOW-UP SYSTEMS
Filed Oct. 29, 1951   2 Sheets-Sheet 1
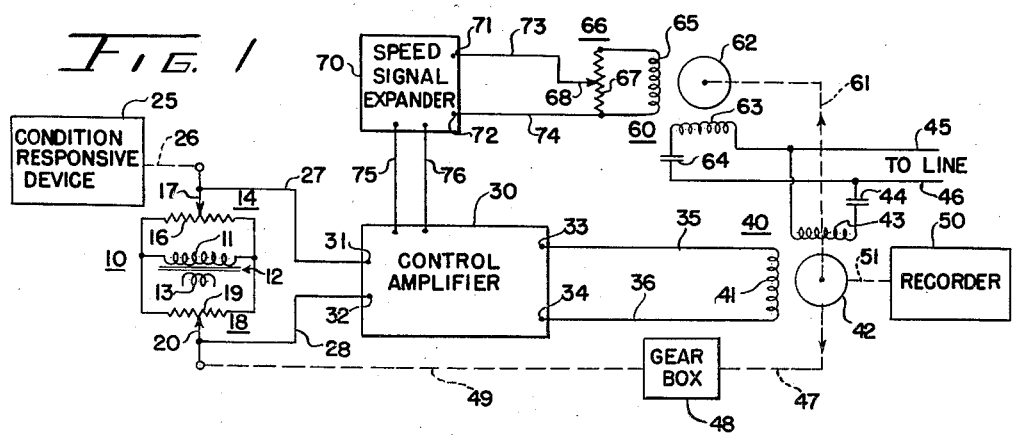
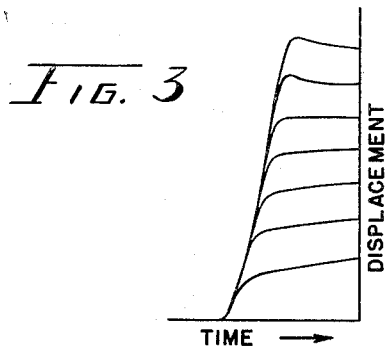
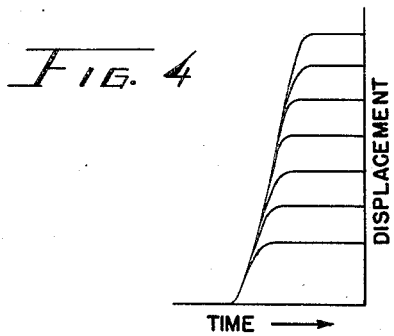
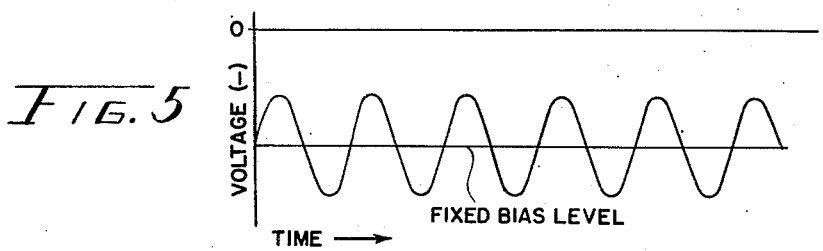
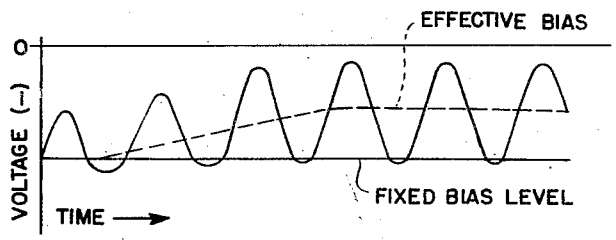
INVENTOR.
HOYT L. HUSTED
BY George H Fisher
ATTORNEY April 6, 1954 H. L. HUSTED 2,674,708
DAMPING ARRANGEMENT FOR ELECTRIC MOTOR FOLLOW-UP SYSTEMS
Filed Oct. 29, 1951 2 Sheets-Sheet 2

INVENTOR.
HOYT L. HUSTED
BY
George H. Fisher
ATTORNEY

Patented Apr. 6, 1954

2,674,708

UNITED STATES PATENT OFFICE 2,674,708

DAMPING ARRANGEMENT FOR ELECTRIC MOTOR FOLLOW-UP SYSTEMS

Hoyt L. Husted, Minneapolis, Minn., assignor to Minneapolis-Honeywell Regulator Company, Minneapolis, Minn., a corporation of Delaware Application October 29, 1951, Serial No. 253,597

11 Claims. (Cl. 318—29)

1

This invention relates to motor control apparatus utilizing a signal voltage in an anti-hunting feedback circuit, which is proportional to the speed of rotation of the motor.

In prior art systems of this type where extremely rapid and accurate motor response is required, it has been found that it is impossible to provide constant damping characteristics for input voltages of various amplitudes. This is particularly true in motor control systems where the signal amplifier has very high gain and tends to saturate when the input signal gets above a predetermined low level and where this amplifier is coupled with a controlled motor which normally does not get up to full speed before reaching an end position. The system can be adjusted for correct damping characteristics and response for input signals in a limited range, but for lower values of input signals the damping action is too great and there is considerable delay and inaccuracy in the motor response. Also, for higher values of input signals the damping action is insufficient and allows the motor to overshoot the desired response and allows more inaccuracies.

It is an object of this invention to overcome these difficulties by providing constant damping characteristics for all values of input signal voltages to the motor control apparatus.

Another object of this invention is to provide a motor control apparatus utilizing a new and improved anti-hunting circuit that provides the correct amount of damping for all values of input signal voltage by utilizing a new and improved method for producing an expanded velocity signal whose amplitude is proportional to the speed of the motor by a power greater than the first power for anti-hunting purposes.

Another object of this invention is to provide a motor control apparatus using velocity feedback and an electronic amplifier whose amplification increases with an increase in the velocity feedback signal.

Another object of this invention is to provide rapid response and rebalancing action to an unbalanced network without overshooting through the use of a non-linear electronic device having an output voltage proportional to its input voltage by a power greater than the first power.

Another object of this invention is to provide a clamping circuit in the input circuit of a non-linear amplifier to vary the bias on the amplifier in accordance with the magnitude of the signal input to the amplifier to expand a velocity signal in a motor control apparatus by a factor greater than the first power.

2

A further object of the invention is to provide a motor control apparatus in which the input signal is opposed by an anti-hunting signal voltage which is proportional to the velocity of the motor by a power greater than the first power.

The various features of novelty which characterize my invention are pointed out with particularity in the claims annexed to and forming a part of this specification. For a better understanding, however, of this invention, its advantages and specific objects obtained by its use, reference should be made to the accompanying drawings and descriptive matter in which I have illustrated and described a preferred embodiment of my invention.

Figure 1 is a block diagram illustrating a preferred embodiment of the invention.

Figures 3 and 5 are diagrams illustrative of the operations of structure known in the prior art.

Figures 4 and 6 are diagrams illustrative of the operation of the invention.

Figure 2:
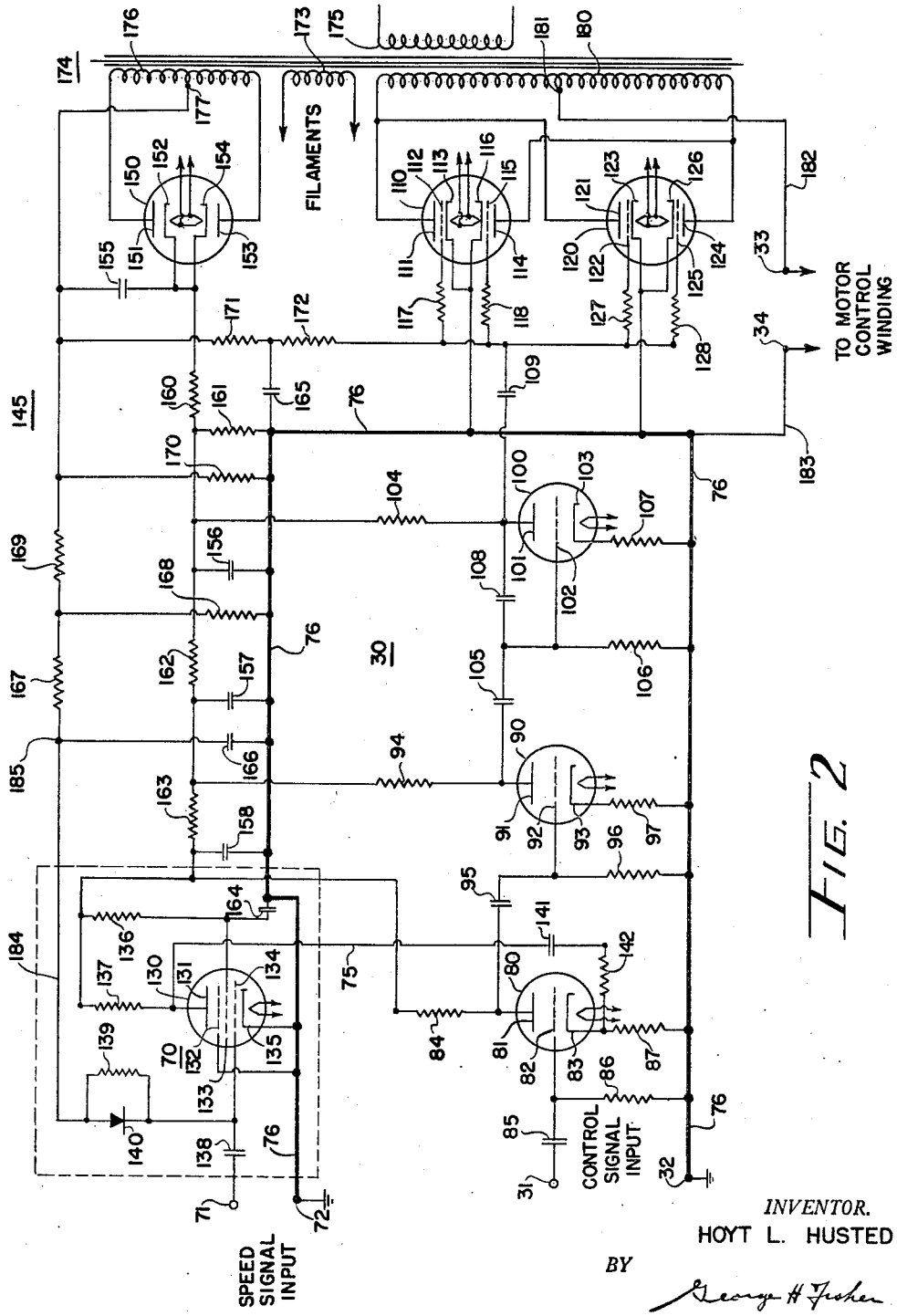
Figure 2 is a more detailed wiring diagram showing the amplifier portions of Figure 1.

Figure 1 shows a normally energized bridge network 10 energized by a secondary winding 11 of a transformer 12 having its primary winding 13 connected to the power lines (not shown). Bridge network 10 consists of a voltage divider 14 having a winding 16 and a slider 17 and a voltage divider 18 having a winding 19 and a slider 20 connected in parallel with each other across secondary winding 11 of transformer 12. When bridge network 10 is unbalanced by displacement of slider 17 by condition responsive device 25 through mechanical connection 26, a voltage is developed between sliders 17 and 20 which is applied to input terminals 31 and 32 of control amplifier 30 through conductors 27 and 28. The output voltage will be of one phase or of the opposite phase depending upon the direction of displacement of slider 17 with respect to slider 20. The details of control amplifier 30 will be explained later. The output voltage of control amplifier 30 is developed across terminals 33 and 34 and applied to control winding 41 of motor 40 through conductors 35 and 36. Motor 40 also has an armature 42 and a line phase winding 43 connected to the power lines (not shown) through phasing capacitor 44 and conductors 45 and 46. Motor 40 rebalances the bridge network 10 by moving slider 20 through mechanical connection 47, gear box 48, and mechanical connection 49. Motor 40 also drives a recorder 50 through mechanical connection 51 to make a visual record of the variations in the condition sensed by condition responsive device 25. The motor also drives a velocity signal generator 60 through mechanical connection 61.

The velocity signal generator 60 is alternating current transformer employing a rotor 62, a primary winding 63, and a secondary winding 65 in a non-inductive relationship with the primary winding. The primary winding 63 is connected to the power lines (not shown) through lines 45 and 46 and phasing capacitor 64. Upon rotation of the rotor 62, current is induced in the secondary winding 65, the current being of the same frequency as the current in the primary winding 63 and of a phase and magnitude depending upon the direction and speed of rotation of the rotor 62.

The current induced in secondary winding 65 of velocity signal generator 60 is developed across voltage divider 66 having a winding 67 and a slider 68. A portion of the voltage developed across voltage divider 66, hereinafter called the speed signal, is applied to input terminals 71 and 72 of the speed signal expander 70 through conductors 73 and 74. After being amplified in speed signal expander 70, the speed signal is applied to control amplifier 30 through conductors 75 and 76 in such a manner that it is in voltage opposition to the control signal applied to control amplifier 30 from bridge network 10. The details of speed signal expander 70 will be explained later. The speed signal is used to provide damping action for the motor 40 to prevent hunting around the balance point.

Figure 2 shows the details of control amplifier 30 and speed signal expander 70 schematically. Control amplifier 30 consists of three stages of voltage amplification using triodes 80, 90, and 100 and an output discriminator stage using twin triodes 110 and 120. Triode 80 has an anode 81, a control electrode 82, and a cathode 83. Associated with triode 80 is an anode load resistor 84, a coupling capacitor 85, a grid leak resistor 86, and a cathode resistor 87. Triode 90 has an anode 91, a control electrode 92, and a cathode 93. Associated with triode 90 is an anode load resister 94, a coupling capacitor 95, a grid leak resistor 96, and a cathode resistor 97. Triode 100 has an anode 101, a control electrode 102, and a cathode 103. Associated with triode 100 is an anode load resistor 104, a coupling capacitor 105, a grid leak resistor 106, a cathode resistor 107, and a parasitic oscillation-suppressing capacitor 108. The upper half of twin triode 110 consists of an anode 111, a control electrode 112, and a cathode 113, and a lower half of twin triode 110 consists of an anode 114, a control electrode 115, and a cathode 116. The upper half of twin triode 120 consists of an anode 121, a control electrode 122, and a cathode 123, and the lower half of twin triode 120 consists of an anode 124, a control electrode 125, and a cathode 126. Associated with tubes 110 and 120 are a coupling capacitor 109 and four parasitic oscillation-suppressing resistors 117, 118, 127, and 128 connected in the control electrode circuits of the four halves of tubes 110 and 120.

Speed signal expander 70 consists of a variable mu pentode 130 having an anode 131, a suppressor electrode 132, a screen electrode 133, a control electrode 134, and a cathode 135. Associated with the pentode 130 is a screen load resistor 136, an anode load resistor 137, a coupling capacitor 138, a grid leak resistor 139, a diode rectifier 140, a coupling capacitor 141 and a resistor 142.

Also shown in Figure 2 is a power supply 145 for supplying the anode potential for the voltage amplifier tubes in control amplifier 30 and speed signal expander 70, and to supply a negative bias voltage for the tubes 110 and 120 in the discriminator stage and the tube 130 in speed signal expander 70. Power supply 145 is a full wave power supply using a rectifier tube 150, the upper half of which consists of an anode 151 and a cathode 152 and the lower half of which consists of an anode 153 and a cathode 154. Associated with the rectifier tube 150 is an anode supply filter consisting of capacitors 155, 156, 157, and 158 and resistors 160, 161, 162, and 163. Further filtering action is supplied at the screen electrode 133 of pentode 130 by a capacitor 164. Also associated with rectifier tube 150 is a bias supply filter consisting of capacitors 165 and 166 and resistors 167, 168, 169, 170, 171, and 172.

All of the tubes used are of the indirectly heated cathode type, and their filaments are energized from secondary winding 173 of a transformer 174 having a primary winding 175 energized from the power lines (not shown). Transformer 174 also has a secondary winding 176 with a center tap 177 to supply the anode potentials for rectifier tube 150, and a secondary winding 180 having a center tap 181 to supply the anode potentials for the discriminator tubes 110 and 120.

In one embodiment of the invention, the following components were found to be satisfactory. Triodes 80, 90, and 100 of control amplifier 30 were each halves of a 12AX7 type tube. Twin triodes 110 and 120 were each a 5687 type tube. Pentode 130 was of the 12BA6 type tube, and rectifier 140 was a type 5647 diode rectifier. Components having the values specified below were used.

| | | |
|---|---|---|
| Resistors 86, 96, 106, 139, and 172 | megohms | .47 |
| Resistors 84, 94, and 104 | do | .22 |
| Resistor 171 | ohms | 100,000 |
| Resistor 142 | do | 75,000 |
| Resistors 136, 162, 163, and 167 | do | 47,000 |
| Resistor 161 | do | 25,000 |
| Resistor 169 | do | 16,000 |
| Resistor 87 | do | 11,000 |
| Resistors 137 and 160 | do | 10,000 |
| Resistor 170 | do | 2,500 |
| Resistor 168 | do | 2,000 |
| Resistors 97 and 107 | do | 1,000 |
| Resistors 117, 118, 127, and 128 | do | 10 |
| Capacitors 85, 138, 141, and 164 | microfarads | .1 |
| Capacitors 155, 156, 157, 158, 165 and 166 | do | .5 |
| Capacitors 95, 105, and 109 | do | .01 |
| Capacitor 108 | micromicrofarads | 150 |

*Operation*

When condition responsive device 25 senses a change in the condition to be measured it unbalances the bridge network 10 by moving slider 17 of voltage divider 14 through mechanical connection 26. An alternating potential difference then develops between sliders 17 and 20 of bridge network 10, the phase of which is dependent upon the direction of relative movement of sliders 17 and 20 and the magnitude of which depends upon the extent of such relative displacement. This potential difference is applied to terminals 31 and 32 of control amplifier 30 through conductors 27 and 28. The signal is then applied to control electrode 82 of triode 80 through coupling capacitor 85. The amplified signal appearing at anode 81 is then applied to control electrode 92 of triode 90 from anode 81 of triode 80 through coupling capacitor 95. The signal is again amplified and applied to control electrode 102 of triode 100 from anode 91 of triode 90 through coupling capacitor 105. Capacitor 108 is connected between the anode 101 and the control electrode 102 of triode 100 to reduce parasitic oscillations developed within triode 100 to a minimum. The signal is further amplified in triode 100 and applied from anode 101 of triode 100 through coupling capacitor 109 to control electrodes 112, 115, 122, and 125 of the respective halves of twin triodes 110 and 120 of the output discriminator stage.

The output discriminator stage is connected for half wave operation. As can be seen in Figure 2, all of the control electrodes of tubes 110 and 120 are fed in phase, while anodes 111 and 121 of the upper halves of tubes 110 and 120, respectively are connected to the upper terminal of secondary winding 180 and anodes 114 and 124 of the lower halves of tubes 110 and 120 respectively are connected to the lower terminal of secondary winding 180. With these connections, the upper halves of tubes 110 and 120 will conduct simultaneously on alternate half cycles for one phase of input signal, and the lower halves of tubes 110 and 120 will conduct simultaneously on the opposite alternate half cycles for an input signal of the opposite phase. The upper halves of tubes 110 and 120 are connected in parallel with each other and the lower halves of tubes 110 and 120 are connected parallel with each other in order to supply a larger current to the motor to obtain high starting torque energization to the motor 40.

The output signal from the discriminator stage is developed between ground conductor 76 and center tap 181 of secondary winding 180, and is applied to output terminals 33 and 34 of control amplifier 30 through conductors 182 and 183. This output signal is then connected to control winding 41 of motor 40 through conductors 35 and 36 to energize motor 40. The motor 40 then rebalances the bridge network 10 by moving slider 20 of voltage divider 18 through mechanical connection 47, gear box 48, and mechanical connection 49, and also drives recorder 50 through mechanical connection 51 to record the changes in the condition to be measured.

In order to provide an accurate record of the changes in the condition to be measured, the motor 40 must respond very rapidly to these changes without hunting. This can be accomplished by providing a signal in the input of the amplifier, which is proportional in magnitude to the speed of the motor and which is in voltage opposition to the input control signal. However, it has been found that the response will be accurate only for a limited range of input signals, when this type of feedback is used. Figure 3 shows superimposed recorder-response curves for a recorder system utilizing this type of feedback. The curves of Figure 3 were obtained by applying step signal voltages into the input of a recorder system of this type. As can be seen from the four lower curves of Figure 3, the motor is over-damped for low input signal voltages. As can be seen from the two upper curves of Figure 3, the motor is underdamped and overshoots for high signal input voltages. The remaining curve of Figure 3 shows that the damping characteristics are correct and the motor's response is accurate for a limited range of input signal voltages. The velocity feedback circuit of the present invention, which overcomes the inaccuracies shown in Figure 3, will now be explained.

The motor 40 also drives a velocity signal generator 60 through mechanical connection 61. A velocity signal voltage or speed signal voltage is then developed across voltage divider 66 by secondary winding 65 of velocity signal generator 60. A portion of this voltage developed across winding 67 of voltage divider 66 is applied to input terminals 71 and 72 of speed signal expander 70 through slider 68 and conductors 73 and 74. The velocity signal is then applied to control electrode 134 of tube 130 through coupling capacitor 138. Associated with the input circuit of tube 130 is a conventional clamping circuit consisting of resistor 139 and rectifier 140. A negative bias voltage is also applied to control electrode 134 of tube 130 through the clamping circuit and conductor 184 from negative terminal 185 of the power supply 145.

Assuming a sinusoidal input voltage applied to a tube having an ordinary biased input, the voltage applied to the control electrode of that tube will be similar to that shown in Figure 5. However, if the tube has a clamping circuit associated with its input, the voltage appearing at the control electrode, when a sinusoidal voltage of constant magnitude is applied to the input circuit, will be similar to that shown in Figure 6. In other words, the effective bias on the tube will be decreased (or increased in the positive direction), by an amount proportional to the magnitude of the signal applied to the input circuit of the tube.

The clamping circuit accomplishes this in the following manner. On the positive half cycle of the speed signal the capacitor 138 assumes a charge positive on the left plate and negative on the right plate and current flows from the right plate of capacitor 138 through resistor 139, power supply 145, ground conductor 76, terminal 72, through the source of speed signal voltage, and terminal 71 to the left side of capacitor 138. No current will flow in rectifier 140 since the current flow is in the rectifier's back direction. This current flow produces a voltage drop across resistor 139, which drives the control electrode 134 of tube 130 positive. On the negative half cycle the capacitor 138 assumes the opposite charge on its plates and current flows in the opposite direction through the same path as mentioned above, with the exception that it now flows through rectifier 140 instead of resistor 139 since the current flow is in the forward direction of the rectifier. Since the voltage drop across the rectifier 140 is very small, the grid now is essentially tied directly to the source of negative bias voltage. When the cycle reaches the negative peak and begins to go positive, the current again reverses and the voltage drop across resistor 139 builds up driving the control electrode 134 positive with respect to the negative bias supply. This action is illustrated in Figure 6, which shows that after the damping action takes place the negative peak of the incoming signal effectively rides on the fixed bias level.

Since the tube 130 of speed signal expander 70 is of the variable mu type as stated previously the amplification of the tube can be changed by varying the bias applied to the tube. By applying the clamping circuit to the input stage of tube 130, the bias applied to tube 130 is made to vary in accordance with the magnitude of the input signal applied to the tube 130. Therefore, the amplification of the tube 130 is also varied in accordance with the variations of the magnitude of the input signal applied to the tube 130. With this type of arrangement, it is possible to obtain an output voltage which is amplified and increases at a rate approaching the square of the rate of increase of the input signal.

The expanded speed signal voltage appearing at the anode 131 of the tube 130 is applied to cathode 83 of triode 80 of control amplifier 30 through conductor 75, coupling capacitor 141 and resistor 142, and is developed across cathode resistor 87 in voltage opposition to the input control signal applied to the control electrode 82 of triode 80. Therefore, the output voltage appearing at anode 81 of triode 80 will be reduced and consequently the energization voltage applied to control winding 41 of motor 40 will be reduced, and cause the motor to be damped and reach the balance point without hunting.

By using the particular speed signal expanding means explained above, the correct amount of damping is provided for any value of input signal voltage. Figure 4 shows a group of superimposed recorder-response curves obtained by using the speed signal expanding means explained above in a velocity feedback circuit. The same values of step input signal voltages were used to obtain the curves shown in Figure 4 as were used to obtain the curves shown in Figure 3. As can be seen in Figure 4, the correct amount of damping is obtained for all values of input signal voltages and the inaccuracies shown in Figure 3 are corrected.

While I have shown and described an embodiment of my invention, it is to be understood that this is for purposes of illustration only and that my invention is to be limited only by the scope of the appended claims.

I claim as my invention:

1. An apparatus of the class described comprising in combination: a first source of signal voltage of reversible sense; an electronic discharge device having an input and an output circuit; circuit means connecting said first signal voltage to said input circuit; an electric motor connected to said output circuit, said motor being operative in one direction or the other depending upon the sense of said first signal voltage; means for producing a second source of signal voltage having a magnitude and sense dependent upon the speed and direction of rotation of said motor; signal expanding means comprising a non-linear electronic amplifying device and having input and output circuits; and circuit means connecting said second source of signal voltage to the input circuit of said signal expanding means and connecting the output circuit of said signal expanding means to the input circuit of said electronic discharge device in opposition to said first signal voltage.

2. An apparatus of the class described comprising in combination: a balanceable network to produce a first signal voltage of reversible sense depending on the direction of unbalance; an electronic discharge device having an input and an output circuit; circuit means connecting said first signal voltage to said input circuit; an electric motor connected to said output circuit, said motor being operative in one direction or the other depending upon the sense of said first signal voltage to rebalance said network; means for producing a second source of signal voltage having a magnitude and sense dependent upon the speed and direction of rotation of said motor; signal expanding means comprising an electronic device having non-linear amplifying characteristic and having input and output circuits; and circuit means connecting said second source of signal voltage to the input circuit of said signal expanding means and connecting the output circuit of said signal expanding means to the input circuit of said electronic discharge device in opposition to said first signal voltage.

3. An apparatus of the class described comprising in combination: a first source of signal voltage of reversible sense; an electronic discharge device having an input and an output circuit; circuit means connecting said first signal voltage to said input circuit; an electric motor connected to said output circuit, said motor being operative in one direction or the other depending upon the sense of said first signal voltage; means for producing a second source of signal voltage having a magnitude and a sense dependent upon the speed and direction of rotation of said motor; signal expanding means comprising a biased non-linear electronic amplifying device and having input and output circuits, the input circuit of said non-linear device comprising means to vary the bias of said non-linear device in proportion to the magnitude of a signal applied to the input circuit of said non-linear device to increase the amplification of said non-linear device with an increase in magnitude of said applied signal; and circuit means connecting said second source of signal voltage to the input circuit of said signal expanding means and connecting the output circuit of said signal expanding means to the input circuit of said electronic discharge device in opposition to said first signal voltage.

4. An apparatus of the class described comprising in combination: a balanceable network to produce a first signal voltage of reversible sense depending upon the direction of unbalance; an electronic discharge device having an input and an output circuit; circuit means connecting said first signal voltage to said input circuit; an electric motor connected to said output circuit, said motor being operative in one direction or the other depending upon the sense of said first signal voltage to rebalance said network; means for producing a second source of signal voltage having a magnitude and sense dependent upon the speed and direction of rotation of said motor; signal expanding means comprising a biased non-linear electronic amplifying device and having input and output circuits; a clamping circuit associated with the input circuit of said device to vary the bias of said device, thereby varying the amplification thereof, in accordance with a signal applied to the input circuit of said device; and circuit means connecting said second source of signal voltage to the input circuit of said signal expanding means and connecting the output circuit of said signal expanding means to the input circuit of said electronic discharge device in opposition to said first signal voltage.

5. An apparatus of the class described comprising in combination: a first source of signal voltage of reversible sense; an electronic discharge device having an input and an output circuit; circuit means connecting said first signal voltage to said input circuit; an electric motor connected to said output circuit, said motor being operative in one direction or the other depending upon the sense of said first signal voltage; means for producing a second source of signal voltage having a magnitude and a sense dependent upon the speed and direction of rotation of said motor; signal expanding means comprising a biased non-linear electronic amplifying device having characteristics whereby its amplification is proportional to the bias and having input and output circuits; a clamping circuit associated with the input circuit of said device to vary the bias of said device in accordance with a signal applied to the input circuit of said device to increase the amplification of said device with an increase in magnitude of the applied signal; and circuit means connecting said second source of signal voltage to the input circuit of said signal expanding means and connecting the output circuit of said signal expanding means to the input circuit of said electronic discharge device in opposition to said first signal voltage.

6. Motor control apparatus comprising in combination: a control signal source; a controlled motor; amplifying means connecting said source in a driving relation to said controlled motor; means for producing a speed signal proportional to the speed of said controlled motor; and means connecting said speed signal to said amplifying means in opposition to said control signal source, said last named means comprising electronic signal expanding means for increasing the effect of said speed signal non-linearly with increases in the speed of said controlled motor.

7. Motor control apparatus comprising in combination: a control signal source; a controlled motor; amplifying means connecting said source in a driving relation to said controlled motor; means for producing a speed signal proportional to the speed of said controlled motor; and means connecting said speed signal to said amplifying means in opposition to said control signal source, said last named means comprising a variable gain amplifying device having an input circuit which comprises electrical means connected to decrease the bias on said device with increases in magnitude of said speed signal to increase the amplification of said variable gain amplifying device.

8. Motor control apparatus comprising in combination: a control signal source; a controlled motor; amplifying means connecting said source in a driving relation to said controlled motor; means for producing a speed signal proportional to the speed of said controlled motor; and means connecting said speed signal to said amplifying means in opposition to said control signal, said last named means comprising a biased variable gain amplifying device and a speed signal clamping circuit connected to the input thereof to effect speed signal expansion on the output of said device with increases in magnitude of said speed signal by varying the bias of said amplifying device.

9. Electronic motor control apparatus comprising: a reversible controlled motor; a control signal source; electronic amplifying means connecting said control signal source to said controlled motor; a velocity signal generating means connected to be driven by said motor and having a speed signal output proportional to the driving speed of said motor; an electronic amplifying device having an input circuit and an output circuit which has its signal amplification varied with changes in the bias on said input; a clamping circuit for varying said bias in accordance with the magnitude of the input speed signal connecting said generating means to said input; and circuit means connecting said output circuit to said amplifying means in voltage opposition to the signal from said control signal source.

10. Motor control apparatus comprising in combination: a control signal source; a controlled motor; amplifying means connecting said source in a reversible driving relation to said controlled motor; means for producing a speed signal having a magnitude proportional to the speed of said controlled motor; and means connecting said speed signal to said amplifying means in opposition to said control signal, said last named means comprising an electronic amplifier the amplification of which increases with increases in magnitude of said speed signal so that the effect of said speed signal in opposing said control signal increases non-linearly with respect to said speed signal.

11. Motor control apparatus comprising in combination: a control signal source; a controlled motor; amplifying means connecting said source in a reversible driving relation to said controlled motor; means for producing a speed signal having a magnitude proportional to the speed of said controlled motor; and means connecting said speed signal to said amplifying means in opposition to said control signal, said last named means comprising an electronic amplifier the amplification of which increases with increases in magnitude of said speed signal so that the output of said amplifier increases in proportion to an increase of said speed by a power greater than the first power.

References Cited in the file of this patent

UNITED STATES PATENTS

| Number | Name | Date |
|---|---|---|
| 2,482,064 | Hornfeck | Sept. 13, 1949 |
| 2,544,922 | Greenough | Mar. 13, 1951 |
| 2,593,950 | Williams | Apr. 22, 1952 |